(12) United States Patent
Flockhart et al.

(10) Patent No.: US 8,385,533 B2
(45) Date of Patent: Feb. 26, 2013

(54) BIDDING WORK ASSIGNMENT ON CONFERENCE/SUBSCRIBE RTP CLEARING HOUSE

(75) Inventors: Andrew D. Flockhart, Thornton, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 753 days.

(21) Appl. No.: 12/563,831

(22) Filed: Sep. 21, 2009

(65) Prior Publication Data

US 2011/0071879 A1    Mar. 24, 2011

(51) Int. Cl.
   *H04M 3/00* (2006.01)
(52) U.S. Cl. .................. 379/265.09; 379/265.1
(58) Field of Classification Search ............. 379/265.09, 379/265.1, 265.14, 266.03, 266.06
See application file for complete search history.

(56) References Cited

U.S. PATENT DOCUMENTS

| | | |
|---|---|---|
| 3,689,132 A | 9/1972 | Baker |
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland et al. |
| 5,155,761 A | 10/1992 | Hammond |
| 5,164,983 A | 11/1992 | Brown et al. |
| 5,174,700 A | 12/1992 | Sgarbi et al. |
| 5,178,898 A | 1/1993 | Juchem |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,329,579 A | 7/1994 | Brunson |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |

(Continued)

FOREIGN PATENT DOCUMENTS

| | | |
|---|---|---|
| CA | 2143198 | 1/1995 |
| CA | 2174762 | 3/1996 |

(Continued)

OTHER PUBLICATIONS

U.S. Appl. No. 10/815,534, filed Mar. 31, 2004, Kiefhaber.

(Continued)

*Primary Examiner* — Creighton Smith
(74) *Attorney, Agent, or Firm* — Sheridan Ross P.C.

(57) ABSTRACT

A distributed contact center and method of managing tasks within such a contact center is provided. The various sites of the distributed contact center are adapted to bid on contacts by transmitting bids to a work item distribution mechanism via RTP streams, thereby enabling the work item distribution mechanism to analyze the bids in real-time and route the contact accordingly.

18 Claims, 5 Drawing Sheets

U.S. PATENT DOCUMENTS

| | | | |
|---|---|---|---|
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,642 A * | 8/1998 | Taylor et al. ............. 379/114.02 |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,940,498 A | 8/1999 | Bardl |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,979,117 A | 11/1999 | Fuller |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,289,969 B1 | 9/2001 | Outten et al. |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,697,457 B2 | 2/2004 | Petrushin |
| 6,704,409 B1 | 3/2004 | Dilip et al. |
| 6,707,903 B2 | 3/2004 | Dilip et al. |
| 6,744,877 B1 | 6/2004 | Edwards |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,785,380 B2 | 8/2004 | Ribera |
| 6,947,543 B2 | 9/2005 | Alvarado et al. |
| 7,035,808 B1 | 4/2006 | Ford |
| 7,035,927 B2 | 4/2006 | Flockhart et al. |
| 7,200,219 B1 | 4/2007 | Edwards et al. |
| 7,295,669 B1 | 11/2007 | Denton |
| 7,417,989 B1 | 8/2008 | Doran |
| 7,444,139 B1 | 10/2008 | Welch et al. |
| 7,500,241 B1 | 3/2009 | Flockhart et al. |

| | | | |
|---|---|---|---|
| 7,574,736 | B2 | 8/2009 | Salapaka et al. |
| 8,116,237 | B2 * | 2/2012 | Steiner et al. ............... 370/260 |
| 2002/0072618 | A1 | 6/2002 | Afzali-Ardakani et al. |
| 2002/0178273 | A1 | 11/2002 | Pardo-Castellote et al. |
| 2002/0194002 | A1 | 12/2002 | Petrushin |
| 2003/0093465 | A1 | 5/2003 | Banerjee et al. |
| 2003/0120789 | A1 | 6/2003 | Hepworth et al. |
| 2003/0174830 | A1 | 9/2003 | Boyer et al. |
| 2003/0177017 | A1 | 9/2003 | Boyer et al. |
| 2004/0003046 | A1 | 1/2004 | Grabelsky et al. |
| 2004/0203878 | A1 | 10/2004 | Thomson |
| 2005/0071211 | A1 | 3/2005 | Flockhart et al. |
| 2005/0071212 | A1 | 3/2005 | Flockhart et al. |
| 2005/0071241 | A1 | 3/2005 | Flockhart et al. |
| 2005/0071844 | A1 | 3/2005 | Flockhart et al. |
| 2006/0015388 | A1 | 1/2006 | Flockhart et al. |
| 2006/0067506 | A1 | 3/2006 | Flockhart et al. |
| 2006/0098625 | A1 | 5/2006 | King et al. |
| 2006/0173921 | A1 | 8/2006 | Jalonen |
| 2007/0072618 | A1 | 3/2007 | Freytsis et al. |
| 2007/0263787 | A1 | 11/2007 | Dong et al. |
| 2007/0299680 | A1 | 12/2007 | Fama et al. |
| 2008/0065902 | A1 * | 3/2008 | Spohrer et al. ............... 713/193 |
| 2008/0084831 | A1 | 4/2008 | Sylvain |
| 2009/0238359 | A1 | 9/2009 | Ely et al. |
| 2009/0279436 | A1 | 11/2009 | Chin et al. |
| 2010/0080150 | A1 * | 4/2010 | Steiner et al. ............... 370/260 |

FOREIGN PATENT DOCUMENTS

| | | |
|---|---|---|
| DE | 102006031080 | 1/2008 |
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| EP | 1643743 | 4/2006 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

U.S. Appl. No. 10/815,566, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Kiefhaber.
U.S. Appl. No. 10/946,638, filed Sep. 20, 2004, Flockhart et al.
U.S. Appl. No. 11/619,504, filed Jan. 3, 2007, Davis et al.
U.S. Appl. No. 12/239,120, filed Sep. 26, 2008, Steiner et al.
U.S. Appl. No. 12/469,523, filed May 20, 2009, Steiner.
U.S. Appl. No. 12/545,386, filed Aug. 21, 2009, Flockhart et al.
"Applications, NPRI's Predictive Dialing Package," Computer Technology (Fall 1993), p. 86.
"Domain Name Services," available at http://www.psm.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, CRC Information Systems, Inc., Tel-ATHENA, Sectional 5—Company C520, p. 95, 1992.
"The Advantages of Load Balancing in the Multi-Call Center Enterprise," Avaya Inc. White Paper (Feb. 2002), pp. 1-13.
"The Dynamic Data Center", The Burton Group, Jun. 11, 2008, pp. 1-30.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
"Call Center Software You Can't Outgrow," Telemarketing® (Jul. 1993), p. 105.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc., "Better Implementation of IP in Large Networks," Avaya, Inc. 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.belisouth.neU NASApp/DNSWebUI/FAQ.jsp, downloaded Mar. 31, 2003,4 pages.
CentreVu Advocate Release 9 User Guide, Avaya Inc., 585-215-953, Issue 1 (Dec. 2000), pp. 1-210.
Chavez, David, et al., "Avaya MultiVantage Software: Adapting Proven Call Processing for the Transition to Converged IP Networks," Avaya, Inc., Aug. 2002, pp. 1-20.
Coles, Scott, "A Guide for Ensuring Service Quality in IP Voice Networks," Avaya, Inc., 2002, pp. 1-17.
Dawson, "NPRI's Powerguide, Software Overview" Call Center Magazine (Jun. 1993), p. 85.
DEFINITY Communications System Generic 3 Call Vectoring/Expert Agent Selection (EAS) Guide, AT&T publication No. 555-230-520 (Issue 4, Sep. 1995).
Doo-Hyun Kim et al. "Collaborative Multimedia Middleware Architecture and Advanced Internet Call Center," Proceedings at the International Conference on Information Networking (Jan. 31, 2001), pp. 246-250.
Douglas W. Stevenson et al., "Name Resolution in network and Systems Management Environments," available at http://netman.cit.buffalo.edu/Doc/Dstevenson/NR-NMSE.html, downloaded Mar. 31, 2003, 16 pages.
E. Noth et al., "Research Issues for the Next Generation Spoken": University of Erlangen-Nuremberg, Bavarian Research Centre for Knowledge-Based Systems, at http://www5.informatik.unierlangen.de/literature/psdir/1999/Noeth99:RIF.ps.gz 16 pages.
Foster, Robin, et al., "Avaya Business Advocate and its Relationship to Multi-Site Load Balancing Applications," Avaya, Inc., Mar. 2002, 14 pages.
GEOTEL Communications Corporation Web site printout entitled "Intelligent CallRouter" Optimizing the Interaction Between Customers and Answering Resources., 1998, 6 pages.
Hill, "Contact Center on Demand: An opportunity for telcos to be leaders in the grid-computing revolution," Telephony Online, Jul. 2, 2003, pp. 1-5.
John H.L. Hansen and Levent M. Arsian, Foreign Accent Classification Using Source Generator Based Prosodic Features, IEEE Proc. ICASSP, vol. 1, pp. 1-4, Detroit USA (May 1995).
L.F. Lamel and J.L. Gauvain, Language Identification Using Phone-Based Acoustic Likelihood, ICASSP-94, 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-32.
Levent M. Arsian, Foreign Accent Classification in American English, Department of Electrical Computer Engineering, Duke University, Thesis, pp. 1-218 (1996).
MIT Project Oxygen, Pervasis, Human-Centered Computing (MIT Laboratory for Computer Science) (Jun. 2000) pp. 1-15.
Presentation by Victor Zue, The MIT Ox90ygen Project, MIT Laboratory for Computer Science (Apr. 25-26, 2000) 9 pages.

* cited by examiner

BIDDING WORK ASSIGNMENT ON CONFERENCE/SUBSCRIBE RTP CLEARING HOUSE

FIELD

The present invention is directed generally to distributed contact centers and mechanisms for operating the same.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling queues for the agent (usually in some order of priority) and delivers to the available agent the highest-priority oldest contact that matches the agent's highest-priority queue.

Originally, contact centers were designed as single site operations. In other words, all of the contact center resources such as servers, agents, managers, and the like were located at a single site. A single site contact center was relatively easy to manage because all of the resources were essentially in a common environment. When an agent became available, the server controlling workflow was apprised of the availability almost instantly and could monitor the contact and agent queues in real-time.

As businesses become global and contact center job outsourcing becomes a viable option to many companies, contact centers are beginning to grow into multiple site operations. The resources for a contact center may be redundantly provided at each site such that every site can operate autonomously and communication between sites is not a requirement for operation. However, providing fully redundant contact center sites can become costly when the only additional resource really required is contact center agents. For this reason, many multiple site contact centers share resources. For example, one site may have all of the resources to be a complete contact center, whereas another site only has contact center agents or other resources with specific skills. The complete contact center receives all incoming contacts and routes the contacts to the other site having only agents or specialized resources. Under this scenario, contact center agent status information has to be relayed from the remote site to the ACD at the complete contact center. In fact, it is often the case in multiple site call centers that large amounts of information about the agents, skills (services), queues, and other status information needs to be transmitted between sites. An example of such a geographically distributed call center is described in US Patent Application No. 20060067506 to Flockhart et al., the entire disclosure of which is hereby incorporated herein by reference.

Contact centers have also evolved to accommodate remotely located, telecommuting workers (e.g., remote contact center agents) that can be added to the contact center on a dynamic basis as demand requires.

SUMMARY

Mechanisms have been developed to facilitate the efficient transmission of status and control information between geographically disparate call centers using codec tunneling. U.S. patent application Ser. No. 11/619,504 to Davis et al., the entire contents of which
incorporated herein by reference, describes how to utilize Session Initiation Protocol (SIP) and a Real-time Transport Protocol (RTP) to communicate data between separate communication elements. This particular patent application proposed to use the capabilities of SIP to find and connect two endpoints and establish an RTP session between the endpoints.

It has also been proposed to utilize conference call facilities to allow interested parties (e.g., distributed locations or devices) to dial into or connect with a secure conference call and then publish and subscribe to data which is published by other participants of the conference call. These mechanisms were first described in U.S. patent application Ser. No. 12/239,120 to Steiner et al., the entire contents of which are incorporated herein by reference. The use of a conference call structure allowed various locations in a contact center to efficiently disseminate status information with other interested parties without broadcasting to the entire contact center (unless every element in the entire contact center was subscribing to a particular conference).

Grid based-contact centers which leverage the above-discussed solutions have also been proposed in U.S. patent application Ser. No. 12/469,523 to Steiner, the entire contents of which are hereby incorporated herein by reference.

While useful in developing a distributed contact center, these above described solutions have yet to fully exploit the potential of a distributed contact center and particularly the ability to distribute work items in an ad-hoc fashion according to processing needs of the work item as well as processing availabilities and needs of contact center agents and other resources.

In accordance with at least some embodiments of the present invention a conference negotiation and bidding process for use in a distributed contact center architecture is provided. More specifically, each remote location in a distributed contact center is capable of generating bids and transmitting the details of such bids to the work item routing engine hosting a bidding-conference as well as other bidding locations (possibly by using the conference/RTP clearing house described in the '120 application). In accordance with at least some embodiments of the present invention, the bids transmitted between remote locations or between a remote location and the work item routing engine via the RTP protocol. The bids may be transmitted in response to receiving a request for bids or unsolicited bids may also be generated and transmitted at a remote location. The request for bids may include various bid requirements parameters such as time, estimated wait time, cost per work item, and locality. These requirements may vary depending upon the nature of the work item(s) needing to be distributed among the remote locations. The bids themselves may include responses to the bid requirement parameters as well as other parameters that can be considered when making a work item distribution decision. This allows each bid to be specifically qualified to a particular request for bid.

Once bids are received at the work item routing engine, the routing engine is then capable of determining how to route work items within the distributed contact center based on the parameters defined in each bid. Routing decisions can be made in accordance with any defined business goals such as reduce costs, decrease wait time, increase overall contact center utilization, or increase customer satisfaction (e.g., try to route the work item to the location closest to the originator of the work item). Bids may also have time/value constraints, for instance, when the bidding is closed, when the work item must be finished, the "quality of work expected" etc. The routing engine can then apply policies to decide the best bid, (may not be the cheapest), that meets the contact center's defined goals.

Embodiments of the present invention allow work requests to be received at any location in a distributed contact center at which point the receiving location sends a status indicator to the other locations (e.g., work item received). This indication may be sent in the form of a status message transmitted via RTP. The other locations in the distributed contact center can respond to this with a bid as described above. Since utilization of the RTP protocol provides a way to quickly share status information between locations in a contact center, the amount of time that the work item waits for routing is relatively small. Also, bids may be sent to routing locations before a work item is actually received. In this configuration, bids are sent to the routing location as the desire of that location to receive work items changes, thereby changing its previous bid parameters.

As noted above, the bids may be shared among other bidding locations such that all locations are aware of current bid values. This increases competitively and promotes efficiency gains. There may, however, be instances where it is not desirable to share bid information between bidding locations. Rather, it may be desirable to send bids directly to the work item routing engine. This may also be facilitated by setting up a single communication channel between the bidding location and the routing location (as is described in the '504 application).

In accordance with at least some embodiments of the present invention, a method of operating a contact center is provided that generally comprises: receiving a contact at a work item distribution mechanism in a contact center, the contact center further comprising at least first and second remote sites in communication with the work item distribution mechanism;

receiving a first and second bid from the first and second remote sites, respectively, the first and second bids comprising bid parameters defining each site's ability or desire to process the contact;

analyzing, at the work item distribution mechanism, the bid parameters of the first and second bids;

determining, based on the analysis, that the bid parameters of the first bid satisfies a set of bid requirements associated with the contact more completely than the bid parameters of the second bid; and routing the contact to the first remote site for processing by the first remote site.

In some embodiments, bidding information may be shared directly between a bidding entity and other bidding entities (e.g., the remote sites), rather than routing the information through a conference mechanism, although one skilled in the art will appreciate that the utilization of the conference mechanism to share bidding information will be the most efficient configuration in most cases. In accordance with at least some embodiments of the present invention, the bidding information may be provided to the work item distribution mechanism and/or other bidding entities via an RTP packet transmitted during an RTP session.

An RTP packet and header structure as well as the Real-time Transport Control Protocol (RTCP) is described more fully in US Patent Publication No. 20030120789 to Hepworth et al., the entire disclosure of which is hereby incorporated by reference. Although embodiments of the invention are described in connection with the use of RTP, it can be appreciated by one of skill in the art that a similar media transport protocol may be employed. Accordingly, as used herein "RTP" is understood to include any standardized or non-standardized packet format for delivering audio and/or video information over a packet switched network. Allowable protocols may include any multicast and/or unicast protocols used in streaming media systems. The protocols may be designed for real-time applications like RTP or they may be designed for non-real-time application. Moreover, RTP as discussed herein can include any past, present, or future version of RTP including Secure RTP (SRTP) and those versions and derivatives of RTP not yet contemplated.

As can be appreciated by one of skill in the art, a contact is understood herein to include voice calls, emails, chat, video calls, fax, Instant Messages (IMs), collaboration software, desktop sharing, conferences, and combinations thereof. Accordingly, a contact center may be equipped to handle any one or a number of the above-noted contact types.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any computing application in which it is desirable to distribute contact center processing tasks.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
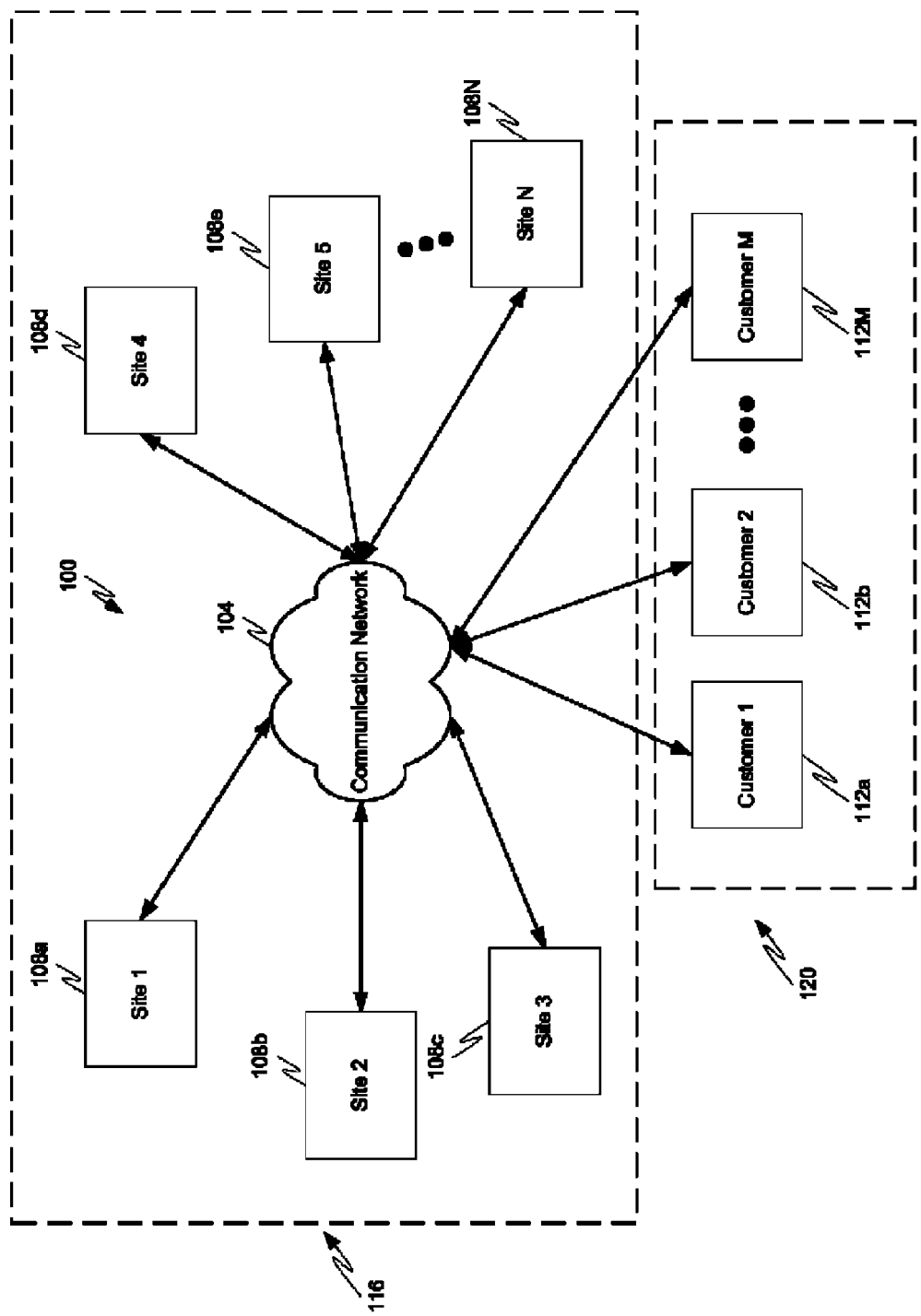
FIG. 1 is a block diagram depicting a distributed contact center in accordance with embodiments of the present invention.

FIG. 1 shows an illustrative embodiment of a distributed contact center 100 in accordance with at least some embodiments of the present invention. The contact center 100 comprises a contact center servicing side 116 that is in communication with a customer side 120. A plurality of contact center sites 108a-N are provided in the contact center to service contacts received from the customer side 120. More specifically, one or more user communication devices 112a-M are adapted to generate contacts that are received at the servicing side 116.

Once a contact is received at the servicing side 116 of the contact center 100, the contact is processed by one or more components at one or more of the sites 108a-N on the servicing side 116. In accordance with at least some embodiments of the present invention, a single site 108 may be separated from other contact center sites 108 by a substantial distance and may be in communication with such other sites 108 via a WAN-type connection. Alternatively, VPN connections may be established between the separated sites 108. In accordance with some embodiments of the present invention, each site 108 is in communication with at least one other site 108 via a specially created RTP communication tunnel. This results in the creation of a communication network that may have any number of different topologies. Examples of such topologies are described in detail, for example, in U.S. patent application Ser. No. 11/619,504. In some embodiments the sites 108 are separated by a large body of water such as an ocean. Thus, trans-continental communication networks must be employed to carry communications between separated sites 108.

Figure 2:
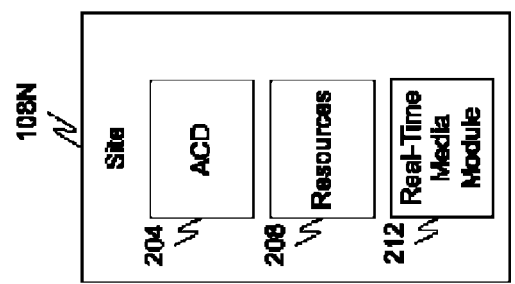
FIG. 2 is a block diagram depicting components of a remote location in a distributed contact center in accordance with embodiments of the present invention.
Figure 2:
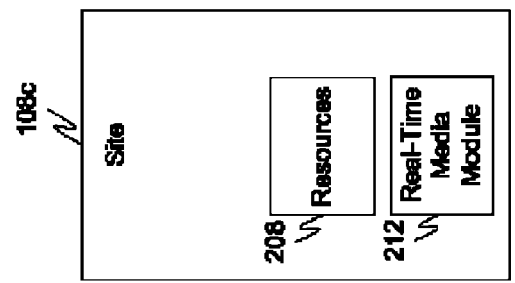
Figure 2:
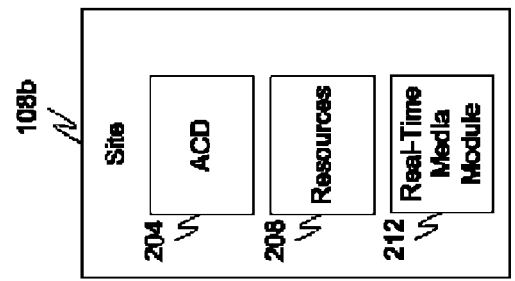
Figure 2:
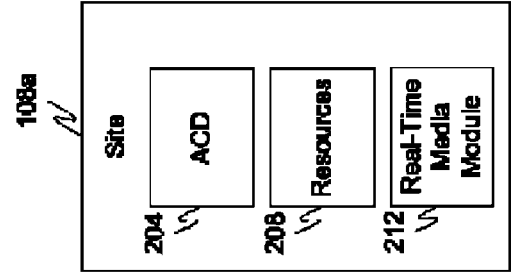

As can be seen in FIG. 2, each of the various contact center sites 108 may comprise resources 208 which include, without limitation, a plurality of agent communication devices which allow a plurality of contact center agents to service contacts and other forms of work items received from customers. The resources 208 of the contact center sites 108 may also comprise IVR servers and other types of automated communication equipment.

In addition, one or more of the sites 108, but not necessarily all of the sites, may be equipped with an ACD 204 or similar type of work item distribution mechanism. The ACD 204 may be provided with business logic and rules for determining how work items should be routed throughout the contact center 100. In accordance with at least some embodiments of the present invention, sites 108 may be adapted to transmit bids for work items to the ACDs 204 of other sites 108. Thus, each ACD 204 in the contact center 100 may be adapted to perform work item distribution functions in accordance with embodiments of the present invention. Specifically, one, two, three, or more ACDs 204 in a single contact center 100 may be configured to receive work item bids from other sites 108, compare said bids to each other and to contact processing requirements and business rules, then route work items among the resources 208 of each site 108. Accordingly, the ACD 204 may determine to keep some work items for local resources 208 while determining to send other work items to remote sites 108. In some embodiments, the site 108 may transmit a bid to itself on behalf of the local resources 208 for analysis by the local ACD 204.

In accordance with at least some embodiments of the present invention, the sites 108 may also be equipped with real-time media transportation modules 212. These modules 212 may be configured to enable the sites 108 to communicate bidding information and other state information to other sites 108 using real-time transport protocols. As one example, the real-time media transportation module 212 may comprise a formatter for generating and formatting RTP packets in accordance with RTP standards. Furthermore, the RTP media session between the various sites 108 may be negotiated using SIP control signaling or other known tunneling procedures.

Referring back to FIG. 1, and as noted above, a communication network 104 is used to connect all of the sites 108 in the servicing side 116 as well as connect the sites 108a-N to user communication devices 112a-M. In accordance with at least some embodiments of the present invention, the communication network 104 may comprise any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication mediums such as coaxial cable, copper cable/wire, fiber-optic cable, antennas for transmitting/receiving wireless messages, and combinations thereof.

Figure 3:
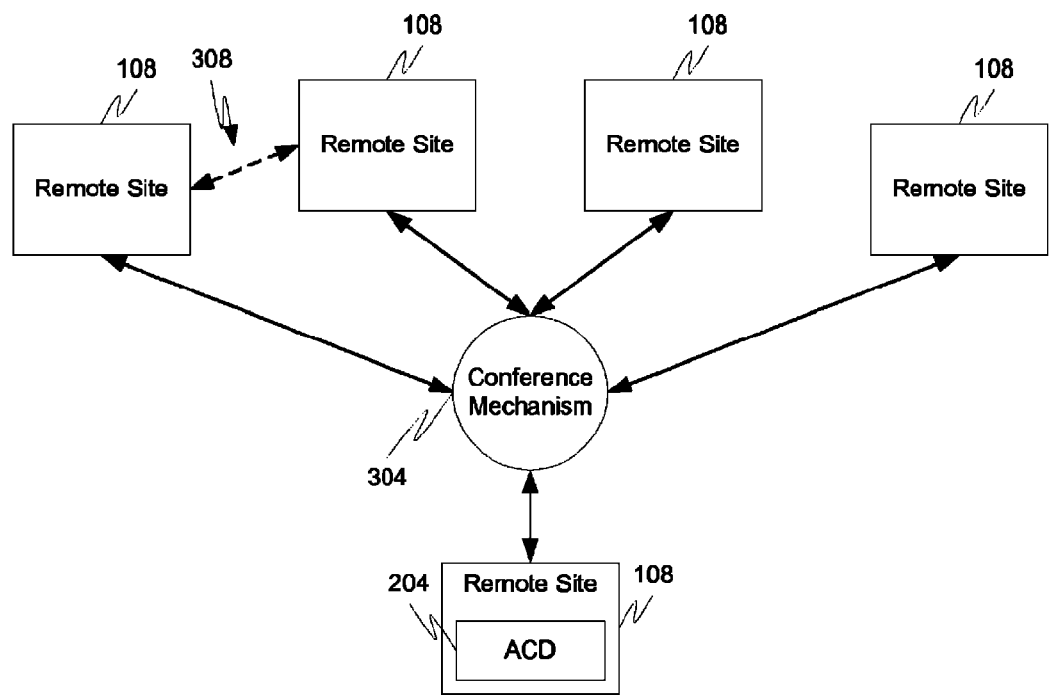
FIG. 3 is a block diagram depicting the interaction of remote contact center locations in accordance with embodiments of the present invention.

Referring now to FIG. 3, an exemplary contact center topology will be discussed in accordance with at least some embodiments of the present invention. As noted above, each of the contact center sites 108 may correspond to any collection of processing resources capable of communicating via the communication network 104 (i.e., each site 108 comprises at least one network interface and a plurality of communication devices). In accordance with at least some embodiments of the present invention, the sites 108 may communicate state information and bids with one another via a conference mechanism 304. The conference mechanism 304 may be similar to those conference mechanisms discussed in U.S. patent application Ser. No. 12/239,120 to Steiner et al. In accordance with some embodiments, bids may be shared among sites 108 via the conference mechanism 304. In other embodiments, bids may be shared directly between sites 108 via optional communication links 308 which avoid the conference mechanism 308.

In some embodiments it may be desirable not to share bids among the sites 108 so as to promote more competitive bidding from each of the sites 108.

In some embodiments, the ACD 204 or the site 108 at which bids are received may be responsible for determining if bids from one site 108 should be shared with another site 108. Thus, the site 108 which receives a plurality of bids from many sites 108 may selectively determine that some bids are going to be shared with a certain subset of bidding sites (possibly less than all of the bidding sites) while other bids are not shared with certain sites 108. The extent to which bids are shared with other sites may vary depending upon business goals and other administratively defined objectives.

Figure 4:
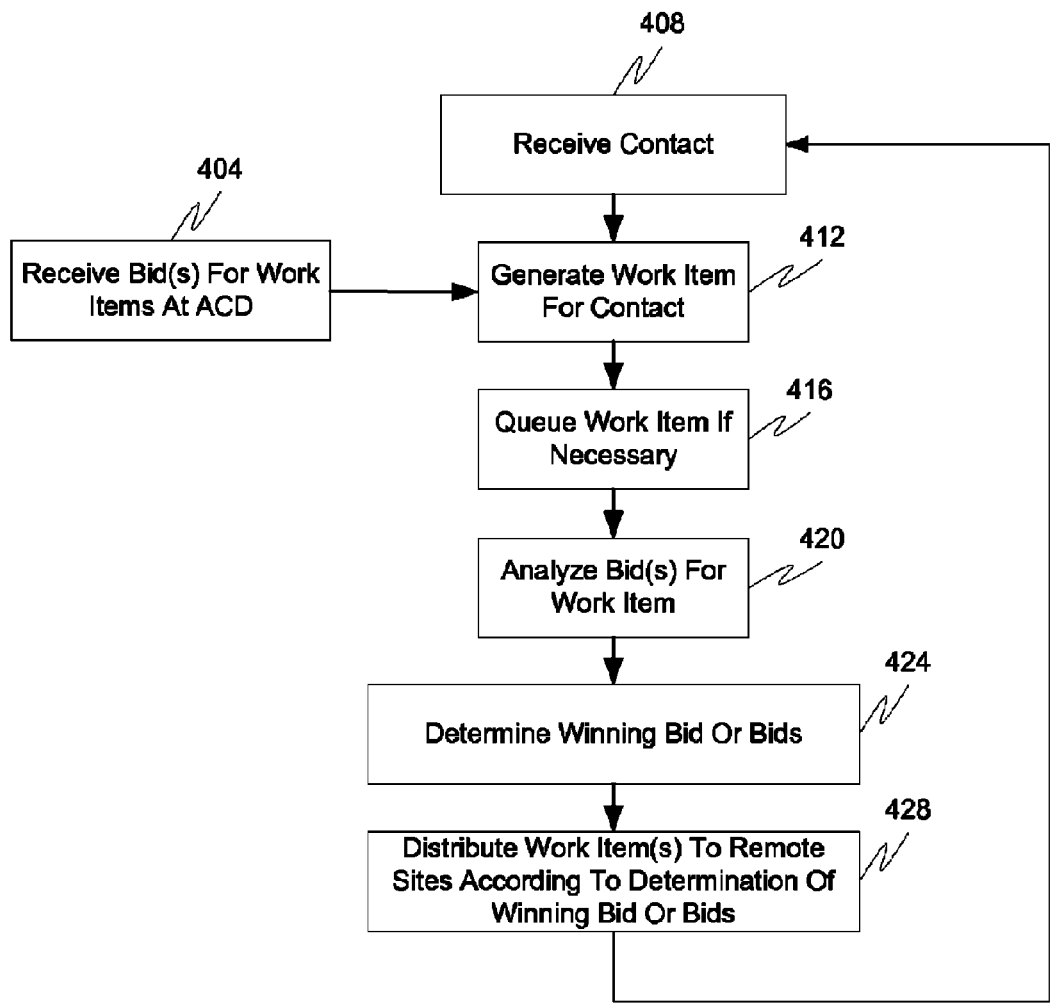
FIG. 4 is a flow chart depicting an exemplary contact center management method in accordance with embodiments of the present invention.

With reference now to FIG. 4, an exemplary method of administering a distributed contact center 100 will be described in accordance with at least some embodiments of the present invention. The method is initiated when a contact is received at a work item distribution mechanism, such as an ACD 204 (step 404).

Upon receiving a contact, the ACD 204 generates a work item corresponding to that contact (step 408). This work item may be automatically assigned to a contact center agent or other type of contact center resource 208 if such a resource is currently available. Otherwise, the work item is enqueued in a work item queue of the ACD 204 (step 416). The work item may comprise a virtual representation of the work to be performed in connection with servicing needs of the customer that escalated the contact and this work item may exist beyond the duration of the contact. For example, a customer may generate a contact which results in a work item being generated and then the customer may disconnect with the contact center until the work item has been picked up by an agent and processed by that agent, at which point the agent may attempt to re-connect with the customer.

The method also comprises a step of receiving or more bids for work items at the ACD 204 from one or more remote sites 108 (step 412). It should be appreciated that this particular step may occur before or after step 404, step 408 and/or step 416. Accordingly, the bids received from the various remote sites 108 may comprise bids for already enqueued work items and well as bids directed toward the desire to process work items generated in the future.

The method continues with the ACD 204 analyzing the bids received from the various remote sites 108 (step 420). In some embodiments the ACD 204 is configured to analyze the bids as they are received and if any of the parameters within a particular bid satisfies business goal parameters defining an acceptable bid, then the ACD 204 may be adapted to automatically route the work item and possibly the corresponding contact to the remote site from which the winning bid was received. In other embodiments, the ACD 204 may be configured to gather a plurality of bids and compare the parameters of each bid against all other collected bids to identify an optimal bid. More specifically, the parameters of each bid may be compared to either each other or to a set of bid requirements. Based on this comparison the ACD 204 may identify the bid which satisfies the set of bid requirements better than all other bids. Alternatively, or in addition, the ACD 204 may consider business logic when making a decision as to which bid is the winning bid. For example, the ACD 204 may attempt to optimize one or more global contact center performance parameters such as minimizing operating cost, maximizing customer satisfaction, minimizing wait time, maximizing agent utilization, and weighted combinations thereof (e.g., 60% effort to maximize customer satisfaction with a 40% effort to minimize operating cost). Accordingly, the ACD 204 may consider a number of different factors when identifying a winning bid or sets of bids (step 424).

After the ACD 204 has identified a winning bid or set of bids, the ACD 204 routes the work item(s) and potentially the contacts associated therewith (e.g., transferring a call, forwarding an email or text message, forwarding a voice message, or providing information for contacting the customer who escalated the contact) to the remote site or sites 108 whom presented the winning bid (step 428). Alternatively, or in addition, the agent can be moved to the work rather than moving the work to the agent. The method then returns to step 404.

Figure 5:
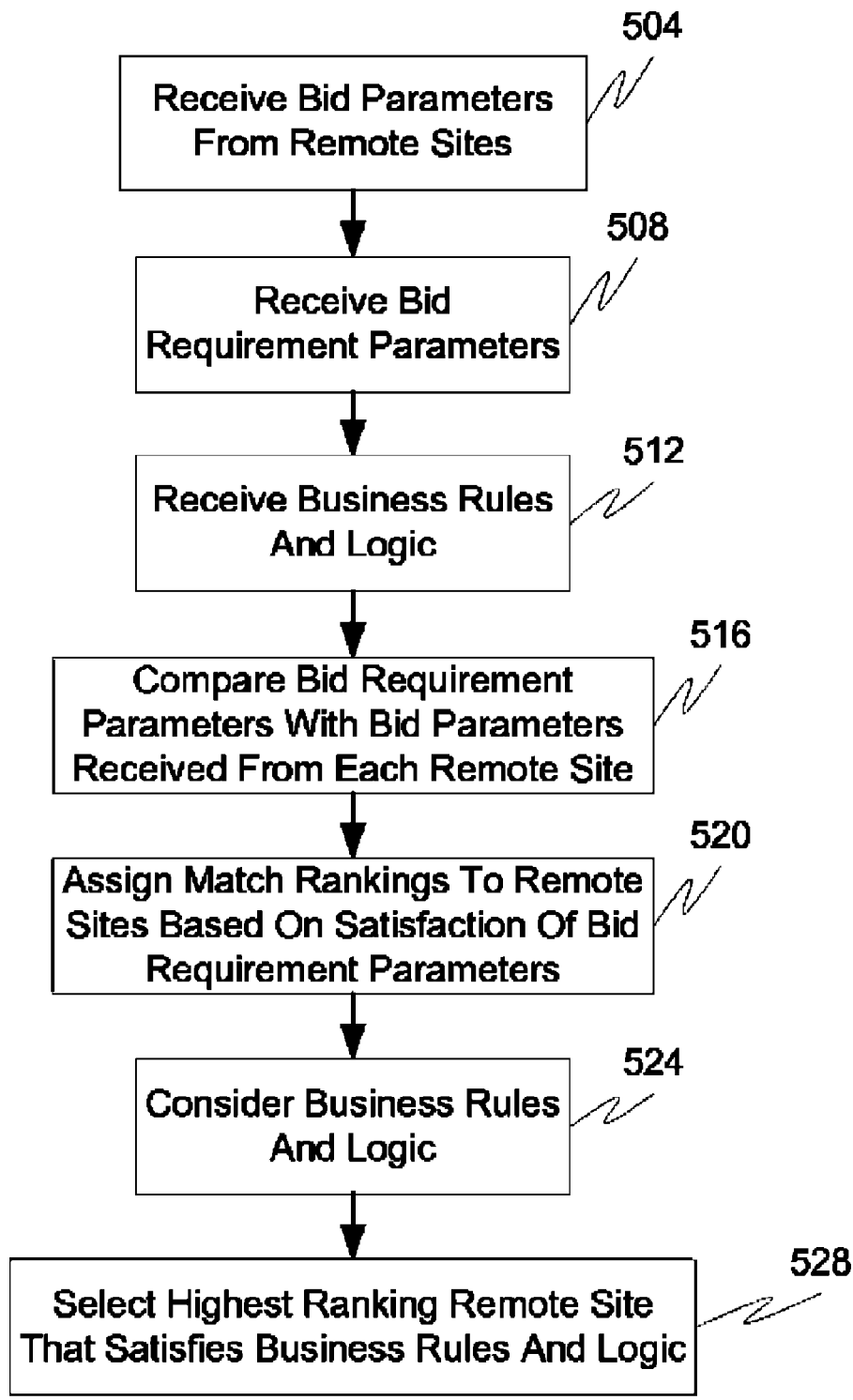
FIG. 5 is a flow chart depicting an exemplary bid assessment method in accordance with embodiments of the present invention.

Referring now to FIG. 5, additional details of analyzing a bid or set of bids will be described in accordance with at least some embodiments of the present invention. The method begins when bid parameters are received from one or more remote sites 108 at an ACD 204 (step 504). Thereafter, the bid requirement parameters are determined by the ACD 204 (step 508). The bid requirement parameters may correspond to any skill parameter or processing need/desire identified for a contact or set of contacts. The skill parameters may include agent skill requirements such as language requirements, proficiency requirements, specialty requirements, experience, and the like. The additional needs or desires for the contact may be obtained from the customer using an IVR or similar data gathering mechanism.

After the bid requirement parameters are gathered, the ACD 204 retrieves the relevant business logic and rules that will also be used to govern work item routing decisions (step 512). The business rules and logic may be administratively programmed directly into the ACD 204 or they may be retrieved from a local data storage area. Alternatively, or in addition, the conference mechanism itself can be used to distribute the logic among a plurality of nodes. As noted above, the business rules or logic is an additional rule or set of rules that governs how the work item should be routed based on business goals and objectives of the contact center 100.

The method continues with the ACD 204 comparing the bid requirement parameters with each of the bid parameters received from the various remote sites 108 (step 516). In this step the ACD 204 is comparing bid parameters with common bid requirement parameters to determine if the bid satisfies that particular bid requirement parameter. As the parameters are compared each bid is given a score representing the number of bid requirement parameters that are satisfied. It may also be possible to award additional points to a particular bid if one of its parameters more than satisfies a particular bid requirement parameter (e.g., if a bid requirement parameter is must be processed in less than one minute and a bid parameter from a particular site 108 indicates an ability to process the work item in half of the required time). The rules used to determine whether a bid parameter more than satisfies a particular bid requirement parameter may be administratively provisioned and can vary from contact center to contact center or can vary over time. Alternatively, or in addition, a bid may be deducted points if one of its parameters does not satisfy a particular bid requirement parameter.

The comparison and scoring of the various bids continues until all bid requirement parameters have been compared with all gathered bid parameters. At this point the ACD 204 assigns match rankings to the remote sites 108 based on the satisfaction of bid requirement parameters (step 520). More specifically, the site 108 having the bid which received the most satisfaction points during the comparison step may be assigned the highest match ranking. The site 108 having the bid which received the second most satisfaction points during the comparison step may be assigned the second highest match ranking and so forth. This provides an ordered list of sites 108 that have been prioritized according to each site's 108 ability or desire to process a work item or set of work items.

Thereafter, the ACD 204 may also consider business logic and other optimization rule sets to achieve a final work item routing decision (step 524). In some embodiments the business logic and optimization rules may allow the ACD 204 to route the work item(s) to the site 108 having the highest match ranking. It could be possible, however, that some circumstances may cause the ACD 204 to select a lower ranking site 108 as a winning site 108 based on the fact that it more completely satisfies stated business goals. This particular step may be carried out by assigning a weighting to each sites 108 match score based on that site's 108 ability to satisfy business goals or optimization rules. After the sites have been analyzed in view of the business goals or optimization rules and the appropriate weighting values have been assigned to each site's score, the ordered list of sites may be reordered according to their new score values. At this point the highest ranking remote site 108 is the one that has satisfied both business goals and optimization rules as well as work item needs more fully than any other site (step 528). It may also be possible that multiple sites 108 have the same score, which means that all of the multiple sites 108 can be considered winning sites and candidates for winning at least a portion of the work items bid upon. This winning site or sites are then identified and the work items
   routed by the ACD 204 accordingly.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA®, or a domain specific language, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for administering a distributed contact center. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A communication method, comprising:
receiving a contact at a work item distribution mechanism in a contact center, the contact center further comprising at least first and second remote sites in communication with the work item distribution mechanism;
generating a work item corresponding to the contact;
receiving a first bid and second bid from the first and second remote sites, respectively, the first and second bids comprising bid parameters defining each site's ability or desire to process the work item, wherein the first bid is provided to the work item distribution mechanism via a first RTP stream established between the first remote site and the work item distribution mechanism;
analyzing, at the work item distribution mechanism, the bid parameters of the first and second bids;
determining, based on the analysis, that the bid parameters of the first bid satisfy a set of bid requirements associated with the contact more completely than the bid parameters of the second bid; and
forwarding the work item to the first remote site for processing by the first remote site.

2. The method of claim 1, wherein the second bid is provided to the work item distribution mechanism via a second RTP stream established between the second remote site and the work item distribution mechanism.

3. The method of claim 2, wherein the first remote site shares the first bid with the second remote site.

4. The method of claim 3, wherein the first bid is shared with the second remote site via the second RTP stream.

5. The method of claim 3, wherein the first bid is shared with the second remote site via a third RTP stream established between the first remote site and the second remote site.

6. The method of claim 3, wherein the first and second RTP streams are established using a Session Initiation Protocol.

7. The method of claim 1, wherein the set of bid requirements comprise a plurality of parameters including one or more of (i) cost requirements; (ii) time requirements; (iii)

volume requirements; (iv) skill requirements; and (v) resource requirements for processing the contact, wherein the bid parameters of the first and second bids include at least one value satisfying the plurality of parameters in the set of bid requirements and wherein the first bid satisfies more of the plurality of parameters than the second bid.

8. The method of claim 1, wherein at least one of the first and second bids comprise a bid to process a plurality of work items in excess of work items enqueued at the work item distribution mechanism and wherein at least one of the first and second bids are received at the work item distribution mechanism before the contact is received at the work item distribution mechanism.

9. A non-transitory computer readable storage medium comprising processor executable instructions stored thereon that, when executed, perform the steps of claim 1.

10. A contact center, comprising:
a work item distribution mechanism in communication with at least a first remote site and second remote site, the work item distribution mechanism being adapted to receive a contact and generate a work item for that contact, the work item distribution mechanism also adapted to receive a first bid and second bid from the first and second remote sites, respectively, the first and second bids comprising bid parameters defining each site's ability or desire to process the work item, wherein the first bid is provided to the work item distribution mechanism via a first RTP stream established between the first remote site and the work item distribution mechanism, wherein the work item distribution mechanism is further adapted to analyze the bid parameters of the first and second bids, determine, based on the analysis, that the bid parameters of the first bid satisfy a set of bid requirements associated with the work item more completely than the bid parameters of the second bid, and route the work item to the first remote site for processing by the first remote site.

11. The contact center of claim 10, wherein the second bid is provided to the work item distribution mechanism via a second RTP stream established between the second remote site and the work item distribution mechanism.

12. The contact center of claim 11, wherein the first remote site shares the first bid with the second remote site.

13. The contact center of claim 12, wherein the first bid is shared with the second remote site via the second RTP stream.

14. The contact center of claim 12, wherein the first bid is shared with the second remote site via a third RTP stream established between the first remote site and the second remote site.

15. The contact center of claim 12, wherein the first and second RTP streams are established using a Session Initiation Protocol and wherein the work item distribution mechanism is distributed among at least the first and second site via a conference mechanism.

16. The contact center of claim 10, wherein the set of bid requirements comprise a plurality of parameters including one or more of (i) cost requirements; (ii) time requirements; (iii) volume requirements; (iv) skill requirements; and (v) resource requirements for processing the work item, wherein the bid parameters of the first and second bids include at least one value satisfying the plurality of parameters in the set of bid requirements and wherein the first bid satisfies more of the plurality of parameters than the second bid.

17. The contact center of claim 10, wherein at least one of the first and second bids comprise a bid to process a plurality of work items in excess of the work items enqueued at the work item distribution mechanism and wherein at least one of the first and second bids are received at the work item distribution mechanism before the contact is received at the work item distribution mechanism.

18. A non-transitory computer program product comprising computer executable instructions stored onto a computer readable medium which, when executed by a processor of a computer, cause the processor to execute a method, the method comprising:
receiving a first bid and second bid from first and second remote sites, respectively, the first and second bids comprising bid parameters defining each site's ability or desire to process one or more work items, wherein the first bid is received via a first RTP stream established with the first remote site;
analyzing the bid parameters of the first and second bids;
determining that the first bid is a winning bid; and
routing one or more work items to the first remote site for processing by the first remote site.

* * * * *